(12) United States Patent
Gelbart et al.

(10) Patent No.: US 11,169,859 B2
(45) Date of Patent: Nov. 9, 2021

(54) SYSTEM AND METHOD FOR TRANSFORMING A DIGITAL CALENDAR INTO A STRATEGIC TOOL

(71) Applicant: Indiggo Associates, Inc., Bethesda, MD (US)

(72) Inventors: Janine Gelbart, Bethesda, MD (US); Marc Inzelstein, Rockville, MD (US); Vijay Perincherry, Potomac, MD (US)

(73) Assignee: INDIGGO LLC, Bethesda, MD (US)

( * ) Notice: Subject to any disclaimer, the term of this patent is extended or adjusted under 35 U.S.C. 154(b) by 0 days.

(21) Appl. No.: 16/395,845

(22) Filed: Apr. 26, 2019

(65) Prior Publication Data

US 2019/0266032 A1    Aug. 29, 2019

Related U.S. Application Data

(63) Continuation-in-part of application No. PCT/US2017/059019, filed on Oct. 30, 2017.

(60) Provisional application No. 62/414,075, filed on Oct. 28, 2016.

(51) Int. Cl.
| | |
|---|---|
| *G06F 9/54* | (2006.01) |
| *G06F 3/0482* | (2013.01) |
| *G06F 3/0484* | (2013.01) |
| *G06F 9/48* | (2006.01) |
| *G06Q 10/10* | (2012.01) |

(52) U.S. Cl.
CPC ............ *G06F 9/542* (2013.01); *G06F 3/0482* (2013.01); *G06F 3/04845* (2013.01); *G06F 9/4837* (2013.01); *G06Q 10/10* (2013.01); *G06Q 10/109* (2013.01); *G06Q 10/1095* (2013.01)

(58) Field of Classification Search
None
See application file for complete search history.

(56) References Cited

U.S. PATENT DOCUMENTS

| | | | |
|---|---|---|---|
| 4,831,552 A * | 5/1989 | Scully | ................ G06Q 10/109 345/1.1 |
| 6,369,840 B1 | 4/2002 | Barnett et al. | |
| 8,060,395 B1 * | 11/2011 | Frasher | .............. G06Q 10/1093 705/7.18 |
| 9,116,986 B1 | 8/2015 | Jackson et al. | |
| 2004/0268270 A1 | 12/2004 | Hill et al. | |
| 2005/0132300 A1 | 6/2005 | Luhrs | |
| 2009/0089133 A1 | 4/2009 | Johnson et al. | |
| 2011/0131514 A1 | 6/2011 | Klberth, Jr. et al. | |
| 2012/0004942 A1 * | 1/2012 | Callanan | .......... G06Q 10/06312 705/7.22 |

(Continued)

OTHER PUBLICATIONS

The International Search Report and the Written Opinion, PCT/US2017/059019, dated Jan. 29, 2018, 16 pages.
European Search Report EP17866009, dated Mar. 16, 2020, 2 pages.

*Primary Examiner* — Charles E Anya
(74) *Attorney, Agent, or Firm* — Indiggo LLC

(57) ABSTRACT

A processor determines a priority for a user of a digital calendar system. The processor determines a link between the priority and a calendar entry in the digital calendar system. A change to the digital calendar system associated with the priority is determined. An effect on the priority based upon the change to the digital calendar system is determined. Data is generated describing a display of the effect on the priority for display in a user interface of the digital calendar system.

19 Claims, 13 Drawing Sheets

(56) References Cited

U.S. PATENT DOCUMENTS

| | | |
|---|---|---|
| 2012/0290979 A1 | 11/2012 | Devecka |
| 2013/0007011 A1* | 1/2013 | Setlur ............... G06F 16/24575 |
| | | 707/748 |
| 2013/0185108 A1 | 7/2013 | Bainbridge et al. |
| 2014/0047316 A1 | 2/2014 | Strydom et al. |
| 2015/0347987 A1 | 12/2015 | Ali |
| 2016/0155095 A1* | 6/2016 | Lance ................ G06Q 10/1093 |
| | | 705/7.19 |
| 2016/0189112 A1* | 6/2016 | Kidron ............... G06Q 10/109 |
| | | 705/7.19 |
| 2016/0342953 A1* | 11/2016 | Hailpern ............ G06Q 10/109 |
| 2016/0364698 A1* | 12/2016 | Bouz ................. G06Q 10/1095 |
| 2018/0039931 A1* | 2/2018 | Dotson .................. H04L 67/10 |

\* cited by examiner

1305 DETERMINING, VIA A PROCESSOR, STRATEGIC PLAN FOR A GROUP OF USERS

1310 DETERMINING INDIVIDUAL AND GROUP PRIORITIES RELATED TO THE STRATEGIC PLAN

1315 DISPLAYING THE INDIVIDUAL AND GROUP PRIORITIES IN A DIGITAL CALENDAR SYSTEM TO DRIVE EFFECTIVE EXECUTION

SYSTEM AND METHOD FOR TRANSFORMING A DIGITAL CALENDAR INTO A STRATEGIC TOOL

CROSS-REFERENCE TO RELATED APPLICATIONS

This application is a Continuation in Part of PCT Application PCT/US2017/59019, which claims priority to U.S. Provisional Patent Application No. 62/414,075, filed Oct. 28, 2016, the entirety of which are incorporated herein by reference.

TECHNICAL FIELD

The present disclosure relates to digital calendar systems.

BACKGROUND

Traditional digital calendar systems or personal information managers (PIMs) provide transactional tools that allow users to automate calendar functions or to operate as personal organizers. A PIM tool's purpose is to facilitate the recording, tracking, and management of certain types of personal information. A PIM tool is concerned with how people organize and maintain personal information collections, and methods that can help people in doing so. Traditional calendars may also allow users to schedule events, organize events, invite other to events and accept event invitations.

Such calendar systems may not support function related to execution of users' actions that are in support of individual, business unit, department level or organization level strategy.

BRIEF DESCRIPTION OF THE DRAWINGS

FIG. 2 is an illustration of a first user interface in which a digital calendar has been transformed into a strategic tool or strategy execution tool, according to an example embodiment.

FIG. 13 is a first flowchart illustrating a process for transforming a digital calendar system into a strategic tool or strategy execution tool, according to an example embodiment.

DESCRIPTION OF EXAMPLE EMBODIMENTS

Overview

The techniques of the present disclosure relate to technology that transforms a digital calendar into strategic took or a strategy execution tool. As used herein, "strategy execution tool" indicates that the tool allows a user to execute a strategy via the tool.

According to the techniques described herein a processor determines a priority for a user of a digital calendar system. The processor determines a link between the priority and a calendar entry in the digital calendar system. A change to the digital calendar system associated with the priority is determined. An effect on the priority based upon the change to the digital calendar system is determined. Data is generated describing a display of the effect on the priority for display in a user interface of the digital calendar system. The effect may be an effect on an individual or group priority.

Also according to the techniques described herein external content is embedded within a user interface of a digital calendar system, wherein the content is received from a source external to the digital calendar system, and wherein the content is contextually relevant to internal content displayed in the user interface that is internal to the digital calendar system. According to specific example embodiments, the content may be displayed together with other contextually relevant data. A user's priority associated with a calendar event is determined. An alignment between a user's desired investment of time in the priority and the user's actual investment of time in the priority is determined.

As used herein, the term "priority" is used to indicate concepts that include a focus area, a specific goal, an objective, a strategy, a key performance indicator (KPI), a task, or any desirable state or outcome desired by a user or their organization.

Example Embodiments

Figure 1:
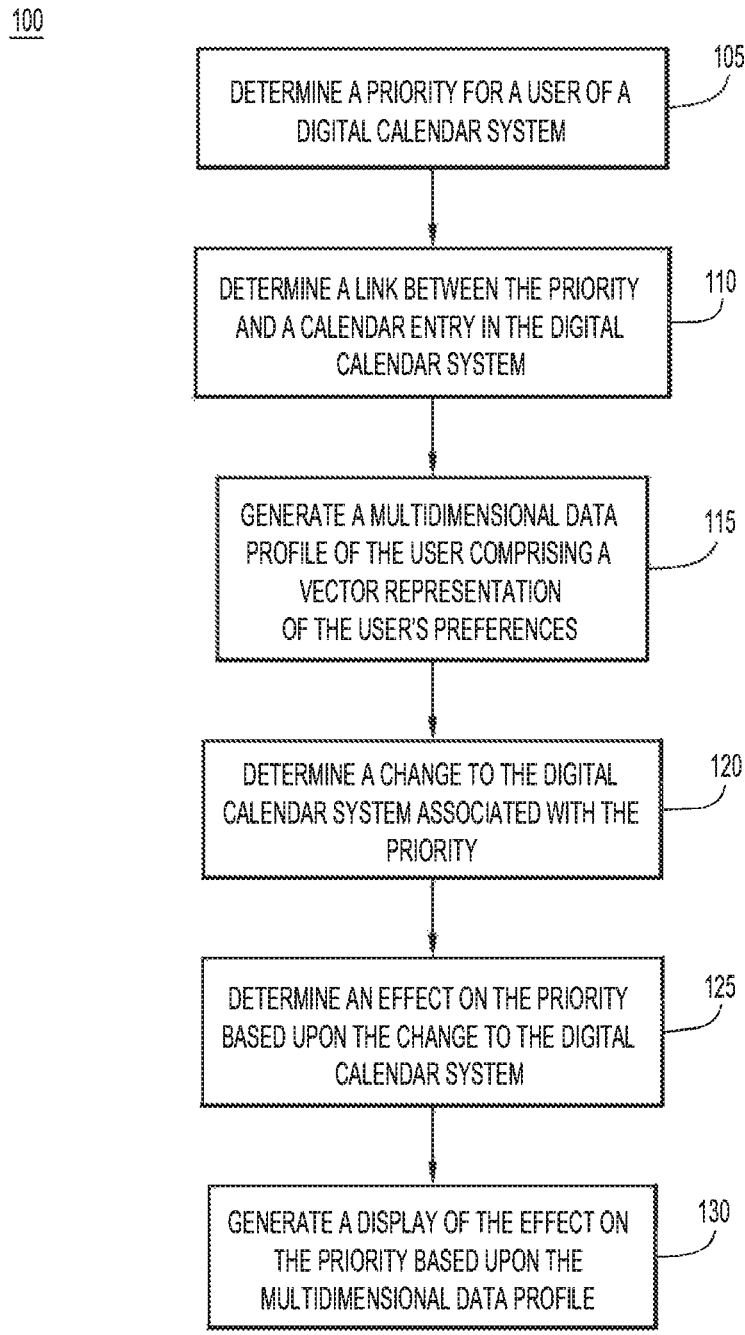
FIG. 1 is a first flowchart illustrating a process for transforming a digital calendar system into a strategic tool or strategy execution tool, according to an example embodiment.

With reference now made to FIG. 1, depicted there is a flowchart 100 illustrating a process according to the techniques described herein for generating a user-specific display within a digital calendar or PIM system. The process of flowchart 100 integrates a strategic tool or strategy execution tool into a users' daily calendar screens as opposed to being a separate interface. The interface enables easy, one click linking of calendar events into an intelligent learning system that enables automated tracking of time focused on priorities, and yields intelligent insights and progress benchmarking. Example embodiments may transform the functionality of a digital calendar system interface from a transactional tool into a strategic work-tool or strategy execution tool which, instead of merely automating calendaring functions, improves user performance, helping users to function more effectively, and pushes users to think about the calendaring actions they are taking with regard to themselves and to others. Example embodiments may also automate linking calendar events to their priorities as a learning system and may give users the ability to scan and modify these automated links directly in the calendar system interface.

According to example embodiments, the display may be based upon a user's "mindset." More specifically, the process of flowchart 100 may be used to generate a display that serves as a tool for a user to reach a desired priority with data tailored to the specific user. The display may be generated, in part, from a multidimensional profile comprising a vector representation of the user's preferences as described in U.S. application Ser. No. 15/092,349 349 (Now U.S. Pat. No. 10,255,700B2), filed on Apr. 6, 2016, the entire contents of which are incorporated by reference herein in their entirety. The multidimensional profiles may be for an individual or for a group, such as a team, a department and/or an organization For example, an individual whose mindset profile indicates an analytical mind with a focus on personal relationships may receive a visual network map indicating their interactions with other people. An individual focused on individual outcomes may receive a display of the amount of time they spend on each of their priorities. Because the displays are tailored to the mindset of the individual user, the visual displays may be designed to trigger an individual to take a corrective action to get back onto a desired path to reach the priority. In other words, the operations illustrated in FIG. 1 may be used to generate a novel set of quantitative metrics and presents visualization strategies that trigger leaders to make strategic choices based on behavioral changes. The system assembles personalized triggers for each individual on the basis of the desired behavior, which can be tailored to the individual's mindset when appropriate.

According to other example embodiments, the displays may be tailored to the mindset and current relevant data of a team, a department and/or an organization. Accordingly, the visual displays may be designed to trigger members of such groups to take one or more actions, such as getting back onto a desired path to reach the priority, updating the priority or related time commitment, aligning with others, reading an insight or information, and other actions. In other words, the operations illustrated in FIG. 1 may be used to generate a novel set of quantitative metrics and presents visualization strategies that trigger leaders to make strategic choices and potentially take related actions based on behavioral changes ore relevant data changes. The system assembles personalized triggers for each individual on the basis of the desired behavior, which can be tailored to the individual's mindset when appropriate.

Figure 2:
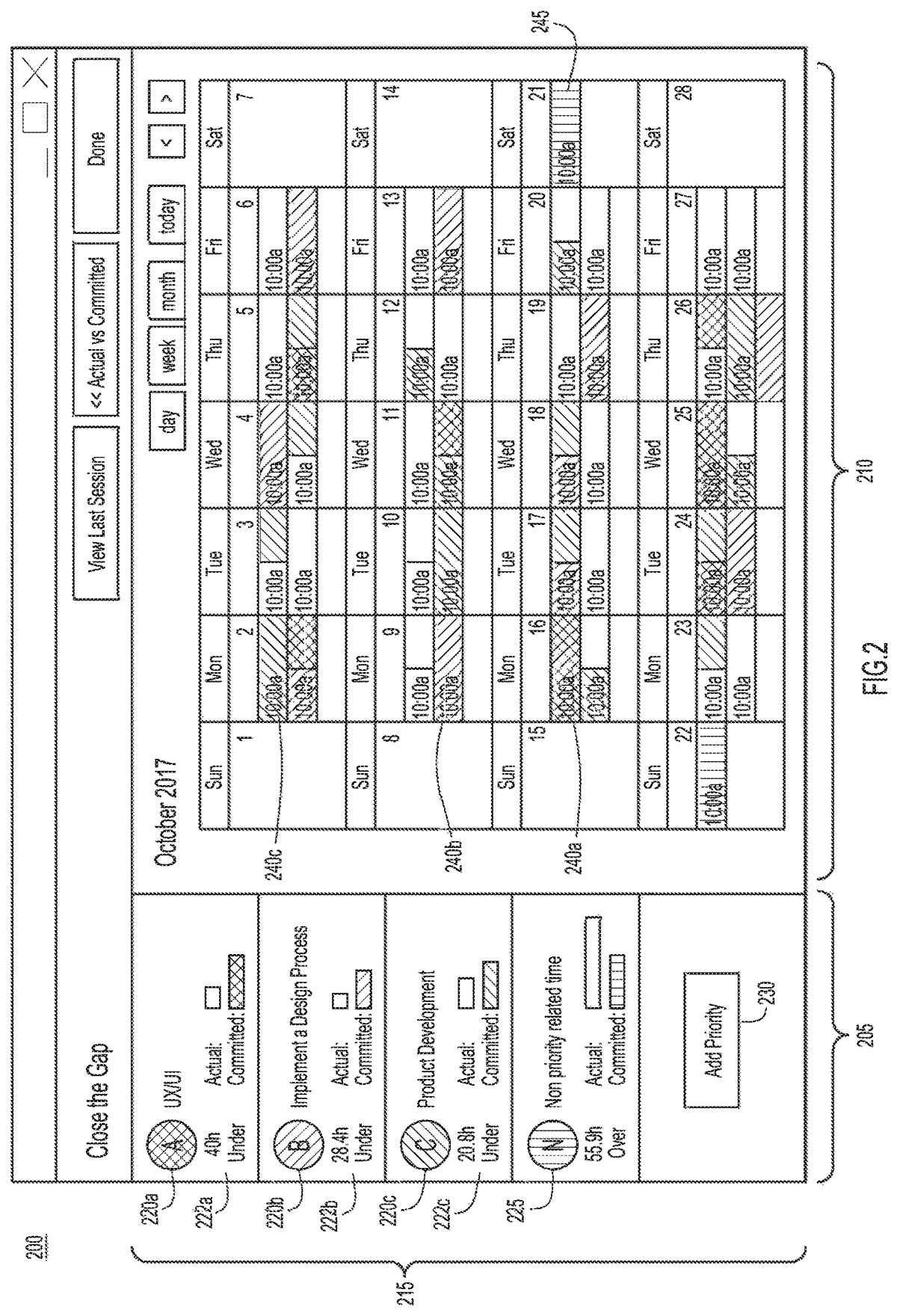

Flowchart 100 begins in operation 105 in which a priority for a user of a digital calendar system is determined. This priority may be entered by the user or automatically generated by the system. For example, a user interface of the digital calendar system may permit a user to enter new priorities that will be integrated into the processes described herein. Turning briefly to FIG. 2, depicted therein is a screenshot of a user interface 200 of a digital calendar system for either an individual, a team, a department and/or an organization. Included in the user interface 200 is a priority portion 205 and a calendar portion 210. Priority portion 205 includes a listing 215 of priorities 220a-c for an individual or a plurality of users, such as a team, a department and/or an organization. The present view of user interface 200 includes the amount of time currently committed to each priority 220a-c. To capture time unassociated with any of priorities 220a-c, non-priority related time 225 is also displayed. According to the example embodiment of FIG. 2, a user is provided with button 230 which allows a user to add a new priority. Accordingly, operation 105 of FIG. 1 may be embodied as a processor receiving data indicating that a user has entered a new priority through a user interface like user interface 200 of FIG. 2, via button 230. According to other example embodiments, when a user creates a calendar entry through, for example, calendar portion 210 of FIG. 2, the user may be prompted to associate a priority with the entry. According to still other example embodiments, if another user creates a calendar invite associated with a priority for that other user, if the invite is accepted by the present user, the priority associated with the invite may become associated with the user receiving the calendar invitation. Accordingly, operation 105 of FIG. 1 may be embodied as a processor receiving data indicating one of the above described events, or other events known to those skilled in the art.

In operation 110, a link between a priority and a calendar entry in the digital calendar system is determined. Similar to the discussion above regarding operation 105, the link between the priority and the calendar entry may take place when a user creates a new priority. According to other example embodiments, the priority may be associated with a calendar entry when a new calendar entry is created, or when a new calendar event invitation is sent or received. Accordingly, operations 105 and 110 of FIG. 1 may take place simultaneous or consecutively, depending on how the priority becomes linked with an entry in the digital calendar system. Similar to operation 105, operation 110 may be embodied as a processor receiving data indicating the link between the priority and the calendar entry.

In operation 115, a multidimensional data profile of the user or group is generated. The multidimensional data profile may comprise a vector representation of preferences of the user or group. Operation 115 may include a series of interactions of the user with a user interface, such as user interface 200 of FIG. 2. More specifically, the data profile may be based upon the techniques described in U.S. patent application Ser. No. 15/092,349 (Now U.S. Pat. No. 10,255,700B2). Accordingly, the generation of the user or group profile may be bases upon interactions within a user interface that include typed text, voice-communicated text, touchscreen input data such as swipes, mouse clicks, answers to questions, minimizing or closing a pop-up window, emojis, icons, accepting or declining a calendar event invitation, sending a calendar event invitation, communicating with other individuals and others. The result of operation 115 may be a profile that includes a series of inclination values stored as vectors which quantify not only the user's mindset, but also the strength of evidence upon which the information is based In operation 120 a change in the digital calendar system associated with the priority is determined. This change in the digital calendar system may be embodied as one or more of the events on the following non-exhaustive list:

Receiving a new calendar invitation associated with the priority;

Sending a new calendar invitation associated with the priority;

Cancelling a calendar event associated with the priority;

Creating/Adding a calendar event associated with the priority;

Modifying a due date associated with the priority;

Modifying a date of a calendar entry associated with the priority;

Removing a link between the priority and a calendar entry;

Detecting another user link or unlink a different priority to a calendar previously associated with a priority of the initial user; and other known to those skilled in the art.

In operation 125, a change to the priority is detected based upon the change to the digital calendar system detected in operation 120. For example, a change in description or change in a user's required commitment to meet the demands of the priority may be determined. The determination of operation 125 may be made based upon data stored in a database system. This information may include:

Metadata related to past and future planned enterprise activities (description, participants, duration, expected outcomes), including past and future calendar events within the digital calendar system;

Descriptions of individual user's current priorities either from data repositories or as described by the user;

Metadata related to commitments made by users in terms of resource allocation;

Metadata related to users' access to organizational content (type of content, time of access, description of content).

In operation 130, a display is generated which indicates the effect of the change in the digital calendar system on the priority. The effect may be on an individual or group priority. The form taken by the display is based upon the multidimensional data profile for the user or group. For example, a multidimensional profile that indicates a user with an analytical mind with a focus on personal relationships may result in a display of a visual network map indicating the user's interactions with other people. A multidimensional profile that indicates a user focused on individual outcomes may result in a display of the amount of time they spend on each of their priorities. An example of such a display is illustrated in FIG. 2 through in time usage portions 222a-c, as well as non-priority related time 225. A more detailed view of such a display is illustrated through user interface 300 of FIG. 3. Accordingly, FIG. 3 displays priority linked time in time usage portions 322a-c and non-priority linked time in portions 325a and b.

Finally, all displays and action triggers are presented inside a window visible within the digital calendar interface to ensure that the user has access to all underlying information and action triggers during the flow of their work, or as an embedded component of their workflow.

Figure 3:
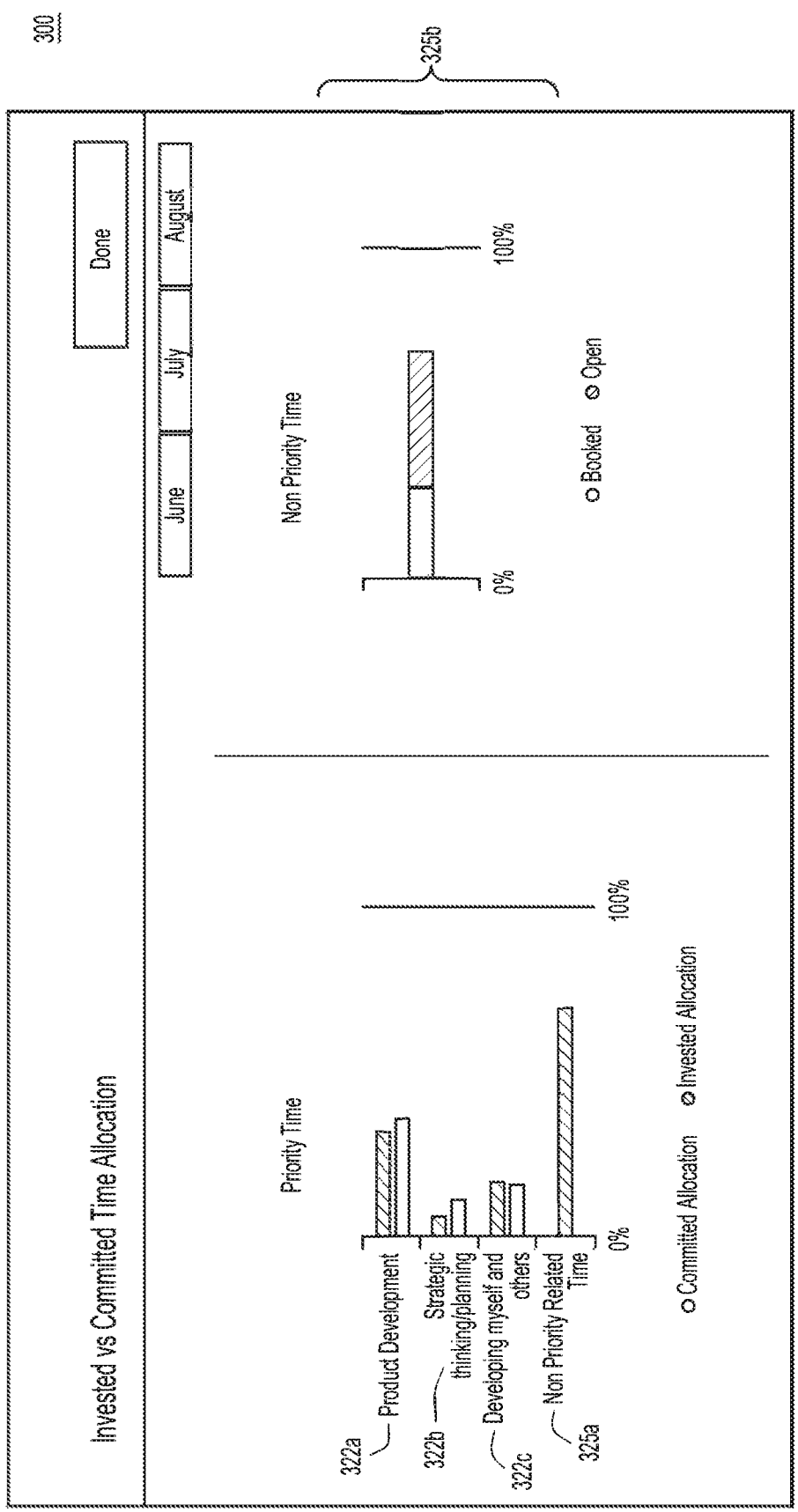
FIG. 3 is an illustration of a second user interface in which a digital calendar has been transformed into a strategic tool or strategy execution tool, according to an example embodiment.

According to some embodiments, the display generated in operation 130 may be generated to include triggers that may trigger users to make strategic choices based on data or behavioral changes. For example, the displays illustrated in FIGS. 2 and 3 provide an aggregated view comparing actual time spent on priorities with the time planned or previously aggregated to the priorities. Such a display allows a user to develop a clear understanding of which priorities are being focused on, which actions to take and whether or not that focus should be altered. Table 1 below provides a chart illustrating a desired behavior and the triggers and displays that may be generated to bring about that behavior.

TABLE 1

Desired Behavior and Corresponding Triggers and Displays

| Behavior | Trigger | Display for generating trigger |
| --- | --- | --- |
| Improve focus on priorities | Clear understanding of current focus on priorities | An aggregated view comparing actual time spent on priorities and planned time |
| Modify choices to Improve use of time against priorities | Having the ability to see their top priorities integrated into daily works screens | Priorities are displayed at key choice points during certain work related activities such as setting a meeting to inviting others to a meeting in order to drive behavior change due to the strategic lens that is provided |
| Modify choices to Improve use of time against priorities | Having the ability to see others priorities integrated into daily work screens | Displaying priorities of others into the calendar display of the user |
| Optimize use of resources including time for focused execution | Insight into the distribution of resource allocation | Display different clusters of events in the calendar, and distribution of time spent on each cluster and how all of this relates to individual and organizational priorities |
| Align with organizational priorities | Insight into resources invested into events that are not aligned with organization's goals | Linking individual calendar events automatically to organizational priorities and displaying the share of time spent on events not aligned with organizational priorities |
| Collaborate effectively | Appreciation of other people's priorities and ensuring effective participation Appreciation of the level and efficiency of collective execution by them and others | Displaying priorities of different users to provide insights into the priorities of other leaders in the organization, driving different choices to optimize effective execution |
| Improve accountability | Insight into individual choices of priorities | Displaying priorities of different users to provide greater understanding and the ability to ensure individuals and teams are choosing relevant priorities as well as informing the choices of others |
| | Decision recording and tracking | Displaying how decisions are made, by whom, when and what specific topic they are related to and having the ability for all concerned to access them from anywhere |

Accordingly, the displays generated in operation 130 may be displays for a strategic tool, such as a strategy execution tool. Such a tool may be particularly advantageous when implemented within the underlying interface and/or workspace of the digital calendar system. The behavioral change required for more effective action is reduced due to the innovative location of the information, triggers and actions in a space where the user already has the habit of going to and working in all the time. This invention is meant to reduce the hurdles of behavior change required to adopt more effective habits. In such an example embodiment, the a framework that has been designed and built to support a certain set of calendaring functions is leveraged to offer a much different set of services and functions using the same underlying interface and workspace. Specifically, such an example embodiment employs an existing digital calendar framework and transforms it into a strategic tool, utilizing the software environment where people already work and integrated into their existing workflow, to bridge the gap between plan and execution. As examples, the system helps users:

Remain aware of priorities while doing daily work;
Improve focus on priorities;
Optimize the use of time;
Proactively block time to focus;
Link use of time to individual and organizational priorities;
View priorities of others;
Maximize effectiveness of collaboration;
Record details on how windows of time are utilized;
Enable efficient follow through from this calendared time which is accessible directly from each specific event;
Become more aware of department organizational priorities and strategies;
Operate with more information and awareness of overall execution focus and patterns; and/or
Helps users to learn while doing versus learn in a separate and disconnected training environment.

More specifically, the above-described benefits may be achieved because the strategic tools (e.g., strategy execution tools) are implemented within the digital calendar interface, an interface that users may use throughout their work-day, and may utilize and access as a matter of habit. By embedding the strategic insights in a tool ingrained in a user's routine, the strategic insights are more likely to be considered and internalized, and therefore, the user is more likely to effectuate the behaviors that the displays generated in operation 130 are intended to cause.

In addition to the operations illustrated in FIG. 1, additional operations may be taken in response to, or as part of the operations of flowchart 100. For example, the process of FIG. 1 may further include additional operations based upon the determined changed to the priority determined in operation 125 that either account for the change or attempt to remedy any negative outcome effectuated by the change. Example actions include:

Evaluating actual usage of available time of individual users to assess leadership capacity, determine gaps and proactively and reallocate this time more appropriately;
Evaluating actual usage of available time of other individual users to guide them on their leadership capacity, determine gaps and proactively and reallocate this time more appropriately;
Evaluating actual usage of time of groups of users to assess leadership capacity, determine gaps and proactively allocate this time more appropriately;
Evaluating capacity gaps and trigger training and recruitment needs;
Determining demand for future use of facilities such as conference rooms, power, audio-video systems and transportation to trigger resource procurement to minimize delays and costs;
Determining the resource needs in different areas of a facility based on calendar entries and proactively managing environmental control systems within offices;
Using information linking resource needs and leadership priorities to proactively plan and trigger optimal resource allocation and timely procurement, including forecast of expenses;
Determining time availability of users and automatically altering future due dates of priorities and/or calendar entries;
Determining additional users likely to assist in executing and meeting priorities and automatically inviting such users to scheduled calendar events;
Automatically rerouting or triggering resources, materials and products in response to changes in priorities. Such rerouting may include real-time path re-computation for automated devices, including unmanned vehicles, such as drones or rerouting or triggering leadership actions to reroute human or other resources in response to changes in priorities.

The process of FIG. 1 may also select alternative or additional communication channels through which to communicate the data contained in the display generated in operation 130. For example, the multidimensional profile for a particular user may indicate that the user tends to interact and/or communicate through communication channels other than the interface of the digital calendar system, such as email, Internet Protocol-based chat applications and/or Short Message Service (SMS) messaging, among others. Accordingly, the process of flowchart 100 may include the distribution of the data included in the display through one of these additional or alternative channels. Utilizing a user's preferred communication channel means that the data contained in the displays are more likely to be considered and internalized, and therefore, the user is more likely to effectuate the behaviors that the displays generated in operation 130 are intended to cause.

With reference again made to FIG. 2, depicted therein is a particularly advantageous example embodiment in which strategic tools for focus, improved individual and collective execution, time prioritization, strategy execution, optimization and effectiveness, have been integrated into the display of the user interface for a digital calendar system. Interface 200 of FIG. 2 reveals meta-level insights of the data displayed, created and stored within the digital calendar system by bringing in and utilizing expert knowledge and external data in a visible and integrated manner. Specifically, priority portion 205 provides these enhanced functionalities through a modified interface that is configured completely as a backend process requiring no effort on the part of the user.

Priority portion 205 transforms the functionality of the digital calendar interface 200 from a transactional tool to a strategy execution platform and strategic work-tool which, instead of merely automating calendaring functions, improves user performance, helping users to execute, align and function more effectively, with more strategic information, in the right place, at the right time, and pushes users to think about the calendaring actions they are taking with regard to themselves and to others. The invention also automates linking calendar events to their priorities as a learning system and gives users the ability to scan and modify these automated links directly in the calendar. Because priorities are displayed in priority portion 205 right alongside calendar entries in calendar portion 210, users are more likely and easily able to link these priorities to calendar entries. For example, a user may simply drag a priority from priority portion 205 onto a calendar entry in calendar portion 210 (or vice versa) in order to link a calendar entry to a particular priority, or be triggered to proactively block time by creating new events to ensure that priorities are afforded necessary attention. Furthermore, this linking may be done without leaving the digital calendar system user interface and/or without selecting a different view within the digital calendar user interface.

Once a calendar entry is linked to a priority, user interface 200 provides users with a clear visual representation of the link. For example, the shading used in user interface 200 visually represents the links between the calendar entries and the priorities 220a-c. For example, calendar entry 240a has shading to illustrate that it is linked to priority 220a, calendar entry 240b has shading to illustrate that it is linked to priority 220b, and calendar entry 240c has shading to illustrate that it is linked to priority 220c. Calendar entry 245, on the other hand, is not linked with a priority, and therefore, calendar entry 245 has shading that corresponds with non-priority related time 225.

Additional benefits of integrating the strategic benefits of priority portion 205 into digital calendar user interface 200 include:

- Users may be able to easily view other peoples' priorities and may be able to guide, compare or align those same priorities with the user's own calendar entries.
- Users may categorize each event in the calendar to individual priorities automatically through a learning model that observes past and future events and patterns of behaviors.
- A modified interface may be created that provides insights into how each event is categorized, as well as the summary past and future planned of time usage committed to priorities.
- Access may be provided to details on time usage and event linking which act as forward looking insights to trigger behavioral shifts.
- Access may be provided to an intelligent system that provides customized insights and guidance to trigger strategic actions.
- Calendar level data and metadata may be aggregated among all individuals within an organization to develop aggregated views that provide insights into the planned and actual past and future capacity allocation of groups of individuals (teams, departments, geographic units, and entire organizations, among others).

Figure 4:
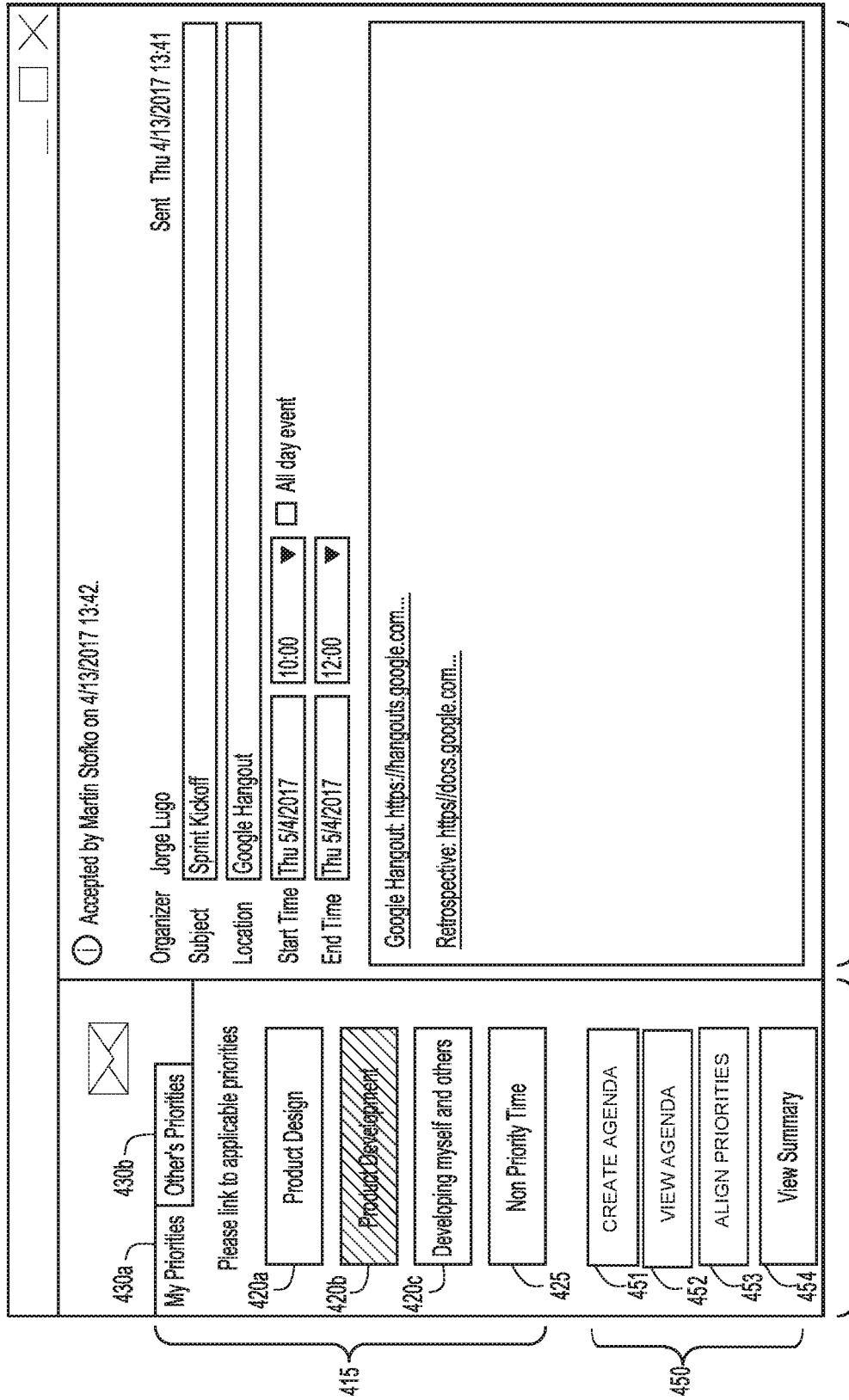
FIG. 4 is an illustration of a third user interface in which a digital calendar has been transformed into a strategic tool or strategy execution tool, according to an example embodiment.

With reference now made to FIG. 4, depicted therein is another example embodiment of the strategic tool of the present disclosure implemented within the user interface 400 of digital calendar system. Like the embodiment of FIG. 2, user interface 400 includes a priorities portion 205, a calendar portion 210 and an action center 450. FIG. 4 illustrates an example embodiment user interface 400 of the user interface after a user has selected a specific calendar entry. Accordingly, calendar portion 210 currently displays a single calendar entry. Even though a single calendar entry is selected, user interface 400 also contains priority portion 205 that displays priority and/or strategic information and/or options for the specific calendar entry displayed in calendar portion 210. For example, in priorities listing 415 the shading of priority 420b "Product Development" indicates that it is associated with the calendar entry displayed in calendar portion 210. Each of priorities 420a-c, as well as non-priority indicator 425 may also serve as a button. By clicking priorities 420a-c, the calendar entry displayed in calendar portion 210 will become linked or associated with the respective priority. Similarly, clicking non-priority indicator 425 allows a user to unlink the calendar entry from all priorities.

Also included in priorities portion 205 of user interface 400 are tabs 430a and 430b. As illustrated, tab 430a is selected, which permits users to view strategic information, in this case priorities 420a-c, associated with the calendar entry. By clicking tab 430b, priority information associated with other uses that are also linked to the displayed calendar entry may be viewed. Furthermore, if the present user has sufficient rights within the digital calendar system, the user may be able to view, associate or link the displayed calendar entry with other users' priorities. Portion 450 of the priorities portion 205 represents an action center which provides users with buttons to provide customized strategic actions including an action 451 to create an agenda for the event if organized by the user, an action 452 request agenda if invited to the event by another user, an action 453 to align the user's priority with a priority of another user or group, and an action 454 to view a summary of the event. Other event related activity may be provided for by activity center 450.

Figure 5:
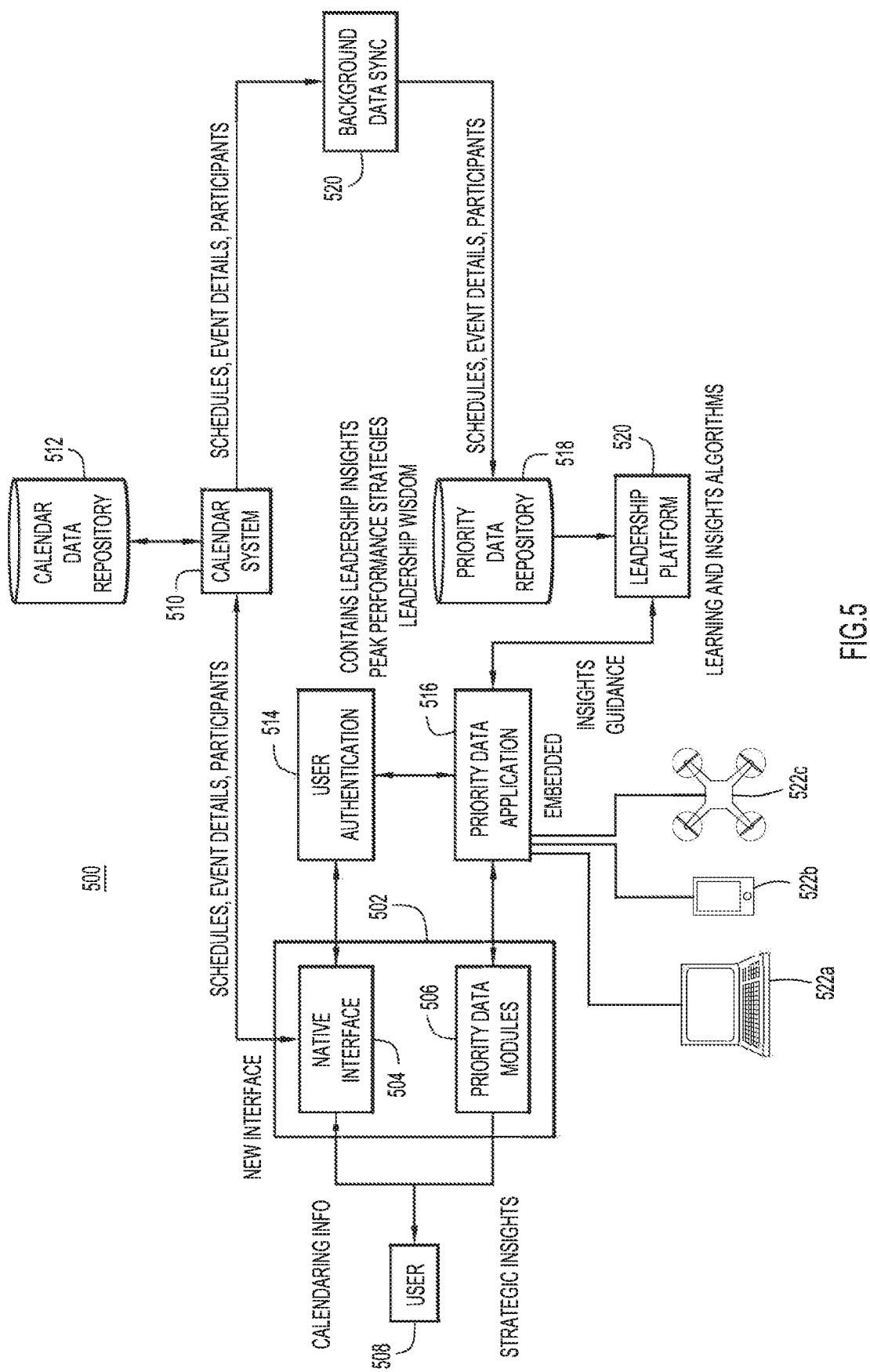
FIG. 5 is an illustration of a block system diagram configured for transforming a digital calendar system into a strategic tool or strategy execution tool, according to an example embodiment.

With reference now made to FIG. 5, depicted therein is a block system diagram 500 of an example embodiment system that may be utilized to implement the techniques described herein. Included in system diagram 500 is user interface 502 that may be embodied as one or more of the user interfaces illustrated in FIGS. 2-4. User interface 502 includes native interface modules 504, which may provide native digital calendar system user interface features, and priority related data modules 506, which may adapt the framework provided by native interface modules 502 to provide a strategy execution tool that helps user 508 to:

- Easily link calendar entries to priorities within a modified calendar view without leaving their calendar screen.
- Easily view other users' priorities within a modified calendar view.
- Categorize calendar events in the calendar to individual priorities automatically through a learning model that observes past events and patterns of behaviors.
- Create a modified interface that provides insights into how each calendar entry is categorized, as well as the summary of time usage among priorities.
- Access details on past and future time usage and event linking which act as insights to trigger behavioral shifts.
- Provide access to an intelligent system that provides customized current and forward looking insights and guidance to trigger strategic actions.
- Aggregate calendar level data and metadata among groups of users to develop aggregated views that provide insights into the current and future workings of groups of individuals, teams, departments, geographic units, and entire organizations, among others.

As illustrated in FIG. 5, the native interface 502 is controlled by calendar system 510. The calendar system 510 may include a data repository 512 which stores data for calendar system 510, such as data defining the calendar events displayed in native interface 502 by calendar system 510. According to some specific example embodiments, calendar system 510 may be embodied as Microsoft's Outlook calendar system. As with many calendar systems, a user authentication module 514 is used to authenticate a user to calendar system 510 before the user is provided with access to the user interface 504.

Priority data modules 506 are controlled by priority data application 516. Specifically, priority data application 516 delivers data to priority data modules 506. Priority data modules 506 utilize this data to embed the data in the user interface 502. The embedding of the data into the user interface 502 transforms the native interface 504, which displays transactional calendaring data, into a strategic execution tool that allows user 508 to see, for example, his or her actual investment of time in his or her priorities compared to a desired or commitment of time, as well as the future investment as currently committed on the calendar. In order to provide this strategic functionality, a priority data repository 518 and a leadership platform 520 are provided. Priority data repository 518 includes individual and collect leadership insights, peak performance strategies, leadership wisdom and data storing the priorities of users of user interface 502. Leadership platform 520 provides individual and collective learning, action and insight algorithms. For example, leadership platform provides the algorithms to determine or detect new priorities for users or organizations and/or update ideal time commitments for users and organizations based upon their interactions within user interface 502. Leadership platform 520 may also include the algorithms to generate and evaluate the multidimensional user profiles and organization profiles that may be used by priority data application 516 to select the appropriate data and communication channel to display to user 508.

Also included in system 500 are background synchronization process 520 and external devices 522*a-c*. Background synchronization process 520 synchronizes the data between calendar data repository 512, priority data repository 518 and other relevant data on plans to execute, gaps in time utilization, and other relevant actions take and decisions made. Because the processing performed by leadership platform 520 and priority data application 516 may need to include information about the data in the calendar system 510, synchronization between the two data repositories may be performed. External devices 522*a-c* may be utilized by priority data application 516 to provide additional channels for communicating the strategic information and action triggers that are generated by leadership platform 520 and priority data application 516. For example, if a multidimensional profile for a particular user indicates that that user interacts more often through email than through user interface 502, computing device 522*a* may be leveraged to send an email containing the strategic data to that user. Similarly, if a multidimensional profile for a particular user indicates that that user interacts more often through SMS or text messaging than through user interface 502, communication device 522*b* may be leveraged to send a text or SMS message containing the strategic data to that user. If the strategic information includes a change in planning that requires rerouting of an external device, such as drone 522*c*, priority application 516 may communicate with drone 522*c* to reroute drone 522*c* in real time.

Figure 6:
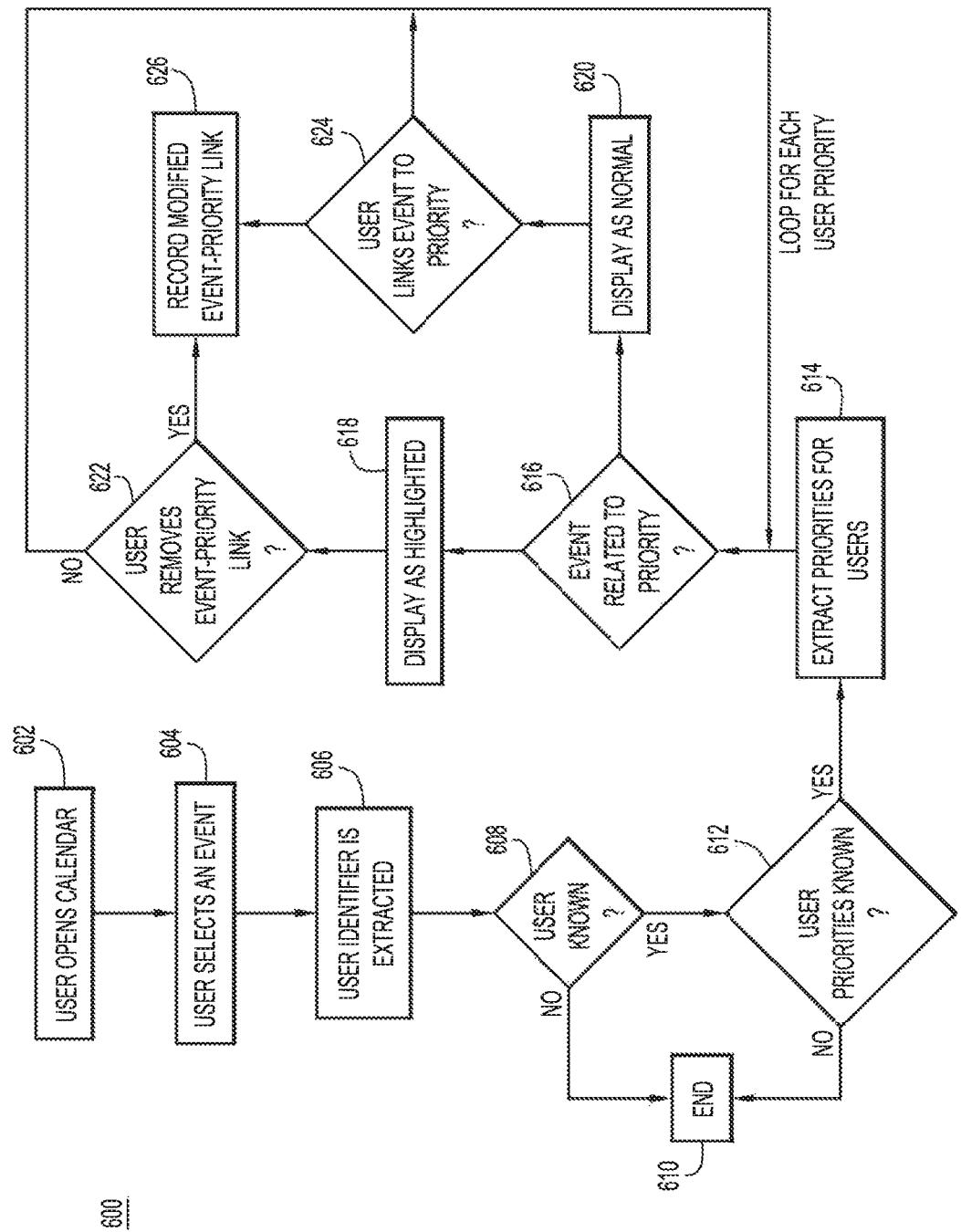
FIG. 6 is a second flowchart illustrating a process for transforming a digital calendar system into a strategic tool or strategy execution tool, according to an example embodiment.

With reference now made to FIG. 6, depicted therein is a flowchart 600 illustrating a process by which priority and execution information is embedded within a user interface of a digital calendar system. For example, the operations illustrated in FIG. 6 may be carried out by one or more of priority data modules 506, priority data application 516 and/or leadership platform 520 of FIG. 5.

Flowchart 600 begins in operation 602 in which a user opens his or her digital calendar system user interface, and subsequently selects a calendar entry or event in operation 604. Accordingly, the operations carried out in flowchart 600 may be used to generate a display like that illustrated in FIGS. 2-5. A user identifier is extracted in operation 606, and a determination is made based upon the identifier as to whether or not the user is known to the priority data system in operation 608. If the user is unknown to the system, the process ends in operation 610. Assuming the user is known, flowchart 600 proceeds to operation 612, where it is determined whether or not user has any priorities in the system. If there are no priorities for the user, processing ends in operation 610. If there are known priorities, processing continues in operation 614.

In operation 614, all of the priorities for the user are extracted. This is because, as illustrated in FIG. 4, all of the priorities may be displayed along with the calendar entry so that user may easily link the calendar entry to any of his or her priorities, or take different action based on the data in the display. These priorities are then each evaluated through a loop to determine whether or not the priority is already linked to the calendar entry. This determination takes place in operation 616. If the priority is linked to the calendar entry, the priority is displayed with highlighting in operation 618. An example of this highlighting may be found in priority 420*b* of FIG. 4. If the priority is not already linked to the calendar entry, the priority is displayed without highlight in operation 620, like priorities 420*a* and 420*c* in FIG. 4.

Operations 622 and 624 monitor how the user interacts in the user interface for priorities linked to the calendar entry and priorities not linked to the calendar entry, respectively. If a linked priority is unlinked, operation 626 will cause the unlinking to be recorded in, for example, a priority data repository, like repository 518 of FIG. 5. If an unlinked priority is linked to the calendar entry by the user, operation 626 will cause the linking to be recorded in, for example, the priority data repository, like repository 518 of FIG. 5. Operations 616-626 will loop through all of the user's priorities until all of the user's priorities have been evaluated.

Figure 7:
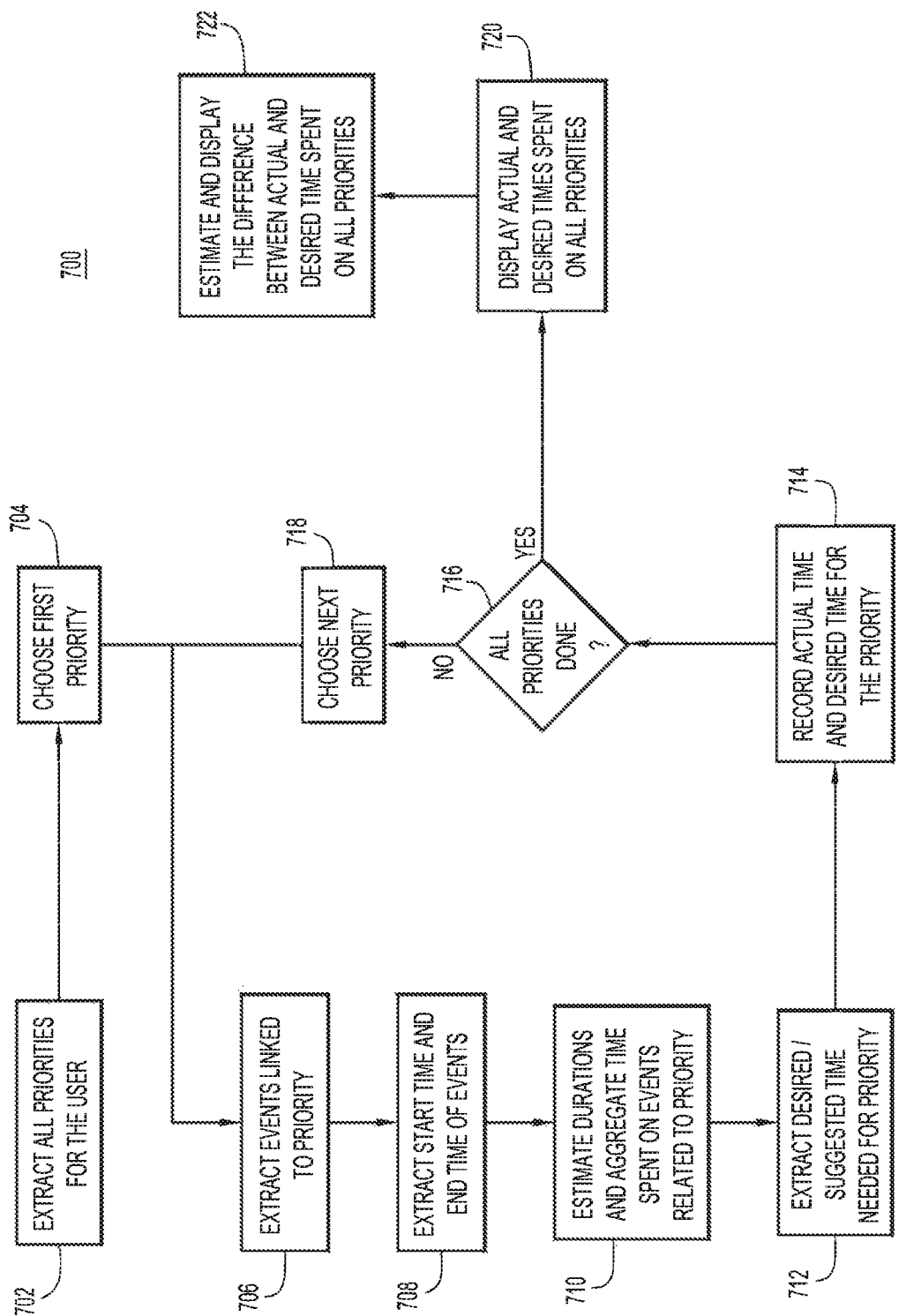
FIG. 7 is a third flowchart illustrating a process for transforming a digital calendar system into a strategic tool or strategy execution tool, according to an example embodiment.

With reference now made to FIG. 7, depicted therein is a flowchart 700 illustrating a process for estimating and displaying a gap between the actual and desired or committed time spent on a user's priorities. In other words, flowchart 700 may be used to populate priority portion 205 of FIG. 2 or in the detailed display 300 of FIG. 3.

Flowchart 700 begins in operation 702 in which all of the priorities for a user are extracted from, for example, priority data repository 518 of FIG. 5. In operation 704, a first of the priorities is selected. In operation 706, the calendar events or entries linked to the selected priority are extracted from, for example, calendar data repository 512 of FIG. 5. In operation 708, start and end times are extracted for all of the linked calendar entries or events, and in operation 710, estimated durations and aggregate time spent on the calendar events or entries are determined.

In operation 712, desired or suggested times for the priority are extracted from, for example, priority data repository 518 of FIG. 5. In operation 714, the actual and desired or suggested times are recorded. Operations 716 and 718 will cause operations 706-714 to repeat or loop for all of the user's priorities. Once all of the priorities have been evaluated in the loop of operations 706-714, operation 720 causes the actual and desired times to be displayed for each priority. Operation 722 estimates and displays the different between the actual and desired times spent on each priority. In other words, operations 720 and 722 generate a display like that of priorities portion 205 of FIG. 2.

Figure 8:
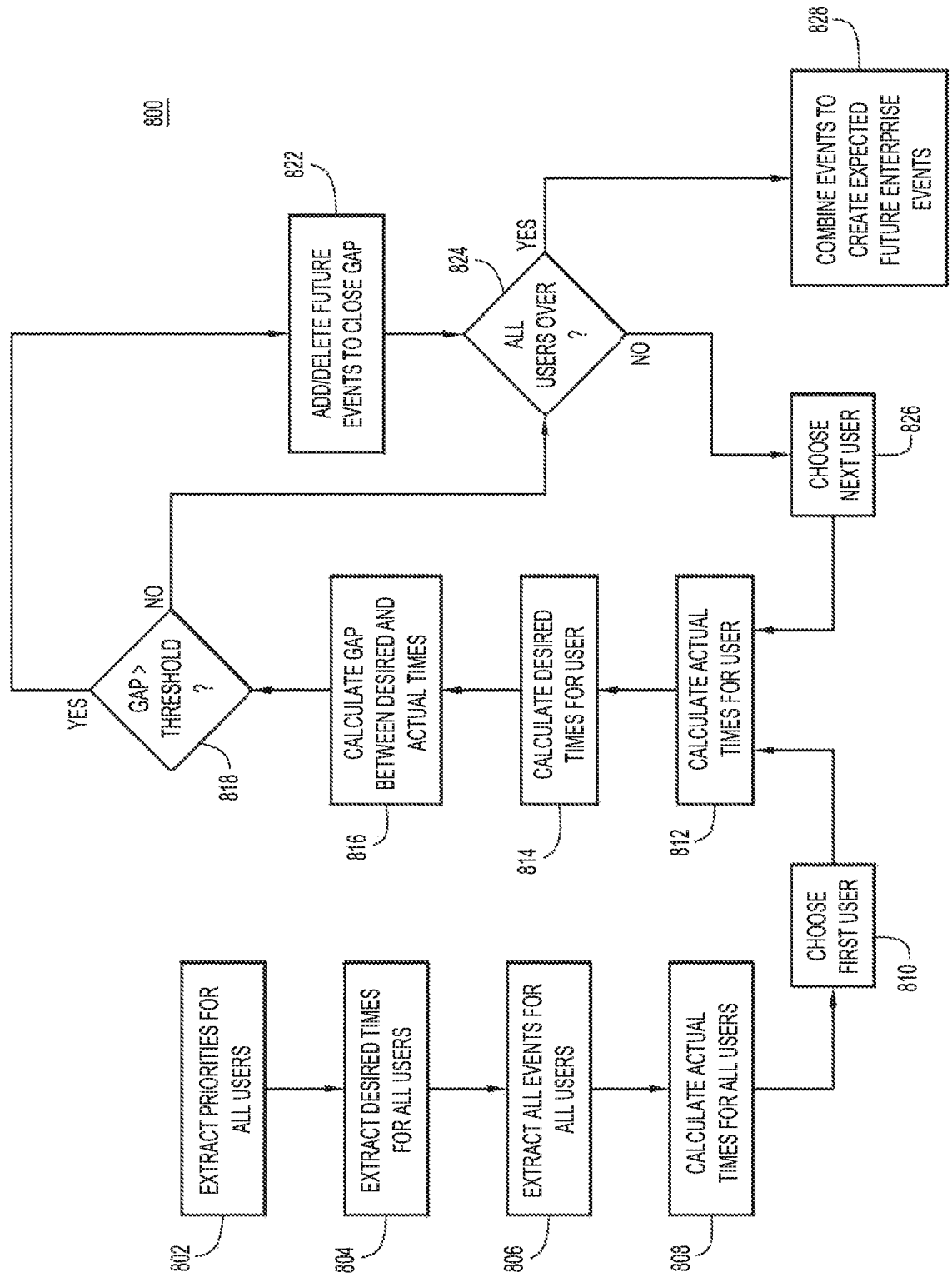
FIG. 8 is a fourth flowchart illustrating a process for transforming a digital calendar system into a strategic tool or strategy execution tool, according to an example embodiment.

With reference now made to FIG. 8, depicted therein is flowchart 800 which provides a process for forecasting future events that may be needed to close the gap between the actual time spent on a priority and the desired or committed time. Accordingly, if a process such as that illustrated in FIG. 7 determines a gap in the actual time spent on a priority and the desired or committed time that surpasses a threshold value, a process like that illustrated in flowchart 800 may be executed in order to forecast future events that may be needed to close the determined gap. These forecasted events may then be automatically scheduled in the digital calendar system. The process of flowchart 800 may be executed by, for example, one or more of priority data modules 506, priority data application 516 and/or leadership platform 520 of FIG. 5.

Flowchart 800 begins in operation 802 where the priorities for all users are extracted, and in operation 804 the desired or committed times for all of the priorities are determined. In operation 806, all calendar events associated or linked with the priorities are determined. Operation 806 may also comprise extracting all calendar entries for the users, as all of the users' calendar entries and/or events may be necessary to appropriately schedule future events in, for example, operations 822 or 828 to be described in more detail below.

In operation 808, the actual time spent on each of the priorities for all of the users is calculated, while in operation 810 one user is selected for comparison of their actual time and the their desired or committed time. In operation 812, the actual times spent on the priorities are calculated for the specific user selected in operation 810, while in operation 814 the time the specific user desired or committed to spend on the priorities are calculated. In operation 816, the gap between the actual time spent on the priorities and the user's desired or committed time is calculated. In operation 818, the gap is compare to a threshold value. In some embodiments, the threshold value will be zero, such that any gap will result in the execution of operation 822, while in other embodiments, a threshold value of greater than zero will be used to permit a certain amount of error or deviation between the actual time spent on a priority and the desired or committed time. If the actual times spent are not greater than the threshold values, processing of flowchart 800 proceeds to operation 824. If the threshold value is exceeded, processing proceeds to operation 822 where future calendar events and/or entries are created to close the gap between the actual time spent by the user on the priorities and the desired or committed time.

Figure 9:
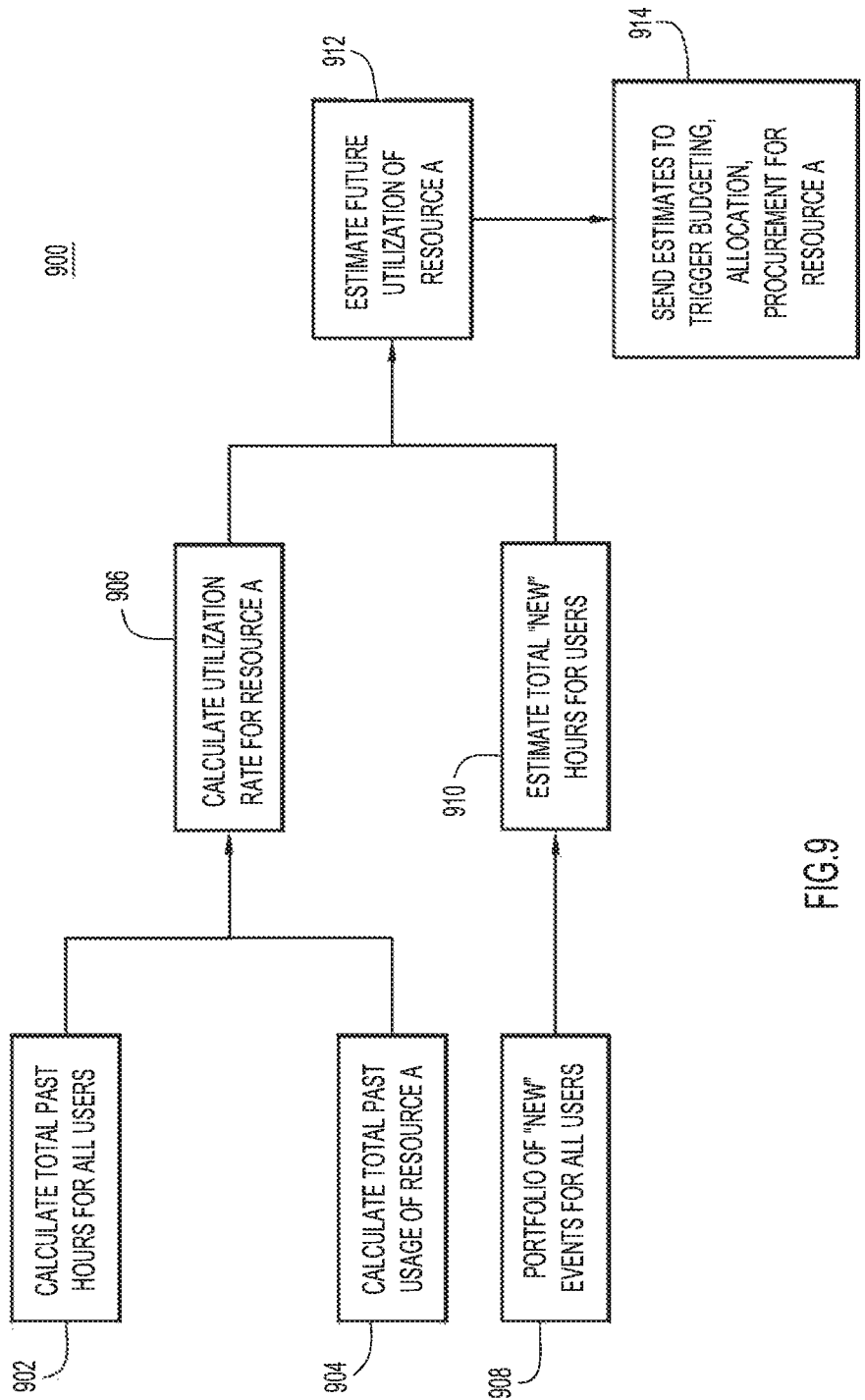
FIG. 9 is a fifth flowchart illustrating a process for transforming a digital calendar system into a strategic tool or strategy execution tool, according to an example embodiment.

In operation 824, a determination is made as to whether or not the current user is the last user to be processed by flowchart 800. If the user is not the last user, processing proceeds to operation 826 where another user is selected, with operations 812-826 serving as a for-loop until all users have been evaluated. When the loop completes and all users have been evaluated, processing proceeds to operation 828 in which events are combined to create expected future enterprise events. Example enterprise events may include:

Strategic leadership meeting sessions;
Customer support events;
Specialized or general training workshops;
Planning events;
Special production events;
Priority alignment conversations;
Celebrating successful execution;
Changing organization or business unit priorities With reference now made to FIG. 9, depicted therein is a flowchart 900 illustrating a process for estimating future allocation of resources, including users, that may be utilized to empower optimal budgeting, capacity allocation and/or procurement. The processing illustrated in FIG. 9 may be utilized in, for example, one or more of operations 822 and/or 828 from FIG. 8.

Flowchart 900 begins in operation 902 where the total past hours for a user or users is calculated. Operation 904 calculates total past usage of one or more resources. Examples of resources include:

Meeting agendas, summaries and follow-thru items;
Conference and meeting locations and facilities;
Event accessories such as A/V systems, security systems, meals, and transportation systems;
Labor resources such as A/V specialists, security personnel, and transportation personnel;
Raw materials and labor directly related to production;
Supply chain and logistic systems related to distribution.

In operation 906, a utilization rate for the one or more resources is calculated based upon the calculations performed in operations 902 and 904.

In operation 908, which may take place currently with, subsequent to or prior to operations 902-906, a portfolio of new events for all users is determined. This portfolio of new events may include a determination of future scheduled events and/or newly created events created by, for example, operations 822 and 828 of FIG. 8. Based upon the portfolio of new events, an estimate is made in operation 910 of new hours that will need to be performed by users to facilitate certain goals or priorities. Based upon the estimated new hours from operation 910, a future utilization of the one or more resources is calculated in operation 912. Finally, in operation 914 the estimates are displayed as strategic information in, for example, the user interface of 502 of FIG. 5 to trigger budgeting, allocation and/or procurement for the one or more resources. Operation 914 may also include communicating and controlling an external device. For example, if the resource in question is office space, operation 512 may include proactively managing environmental control systems within offices associated with the resource. If the resource in question is an unmanned vehicle, operation 914 may include communicating with an external device to provide real-time path re-computation for the unmanned vehicle.

Figure 10:
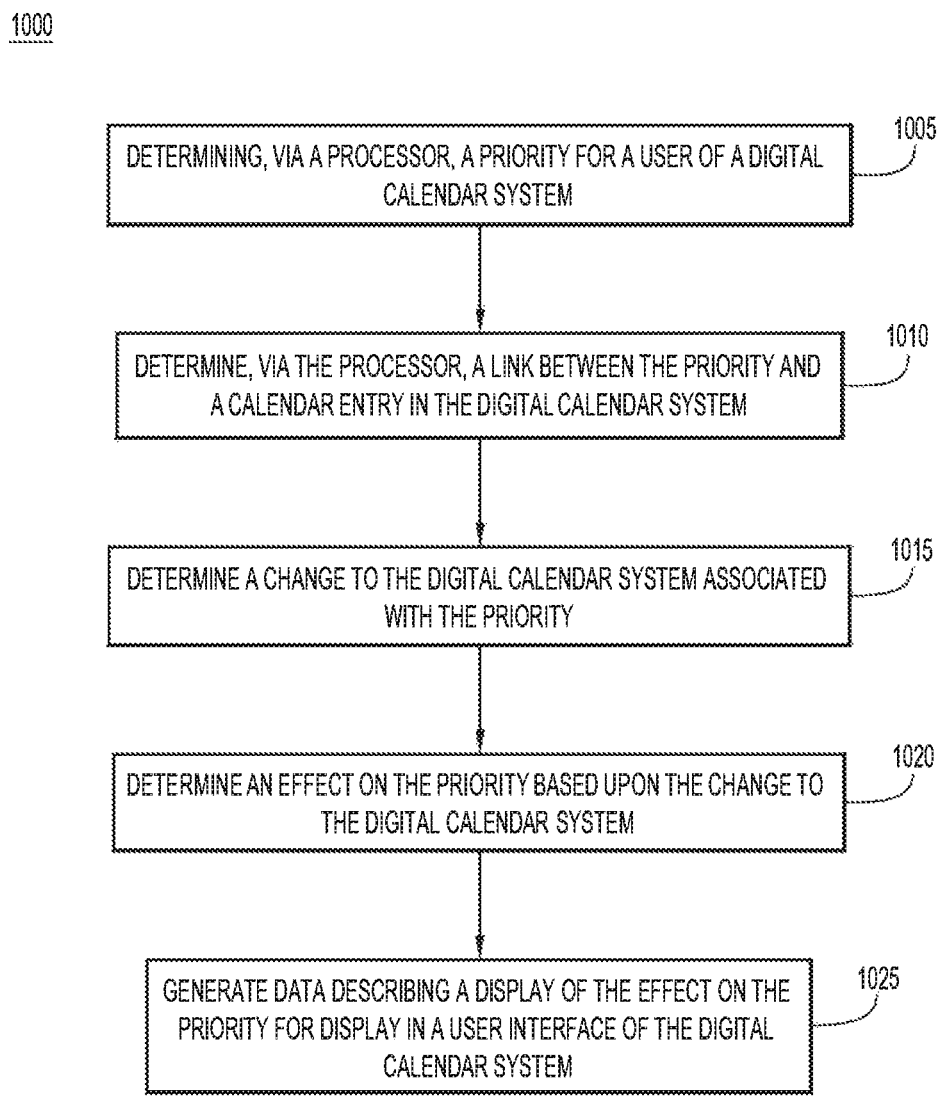
FIG. 10 is a sixth flowchart illustrating a process for transforming a digital calendar system into a strategic tool or strategy execution tool, according to an example embodiment.

With reference now made to FIG. 10, depicted therein is an alternative example embodiment of a method of generating a strategic display according to the techniques described herein. Specifically, flowchart 1000 illustrates a process for generating a user-specific display within a digital calendar system, but does so without reference to a multi-dimensional profile for the user. In operation 1005, a priority for a user is determined by a processor. This priority may be determined, by for example, extracting the priority from a priority data repository, like priority data repository 518 of FIG. 5. A link between the priority and a calendar entry in the digital calendar system is determined by the processor in operation 1010. This link may also be determined based upon the contents of a priority data repository, like priority data repository 518 of FIG. 5.

In operation 1015, a change to the digital calendar is determined by the processor. For example, a user may link or unlink a calendar entry to a priority. In response to this linking or unlinking, values associated with the priority may be updated. Such an effect is determined in operation 1020. For example, linking a new calendar entry to a priority may alter the amount of actual, desire or committed time for the priority. Accordingly, a display like priority portion 205 of FIG. 2 may need to be updated. Accordingly, operation 1020 may be embodied through, for examples, operations carried out in FIG. 5. In operation 1025, data describing a display of the effect on the priority is generated. This data may be used to display the effect of the change in a user interface of a digital calendar system. In other words, operation 1025 may be embodied as the updating of a priority portion in a user interface, such as the updating of priority portion 205 of FIG. 2, or the updating of the data displayed in FIG. 3.

Figure 11:
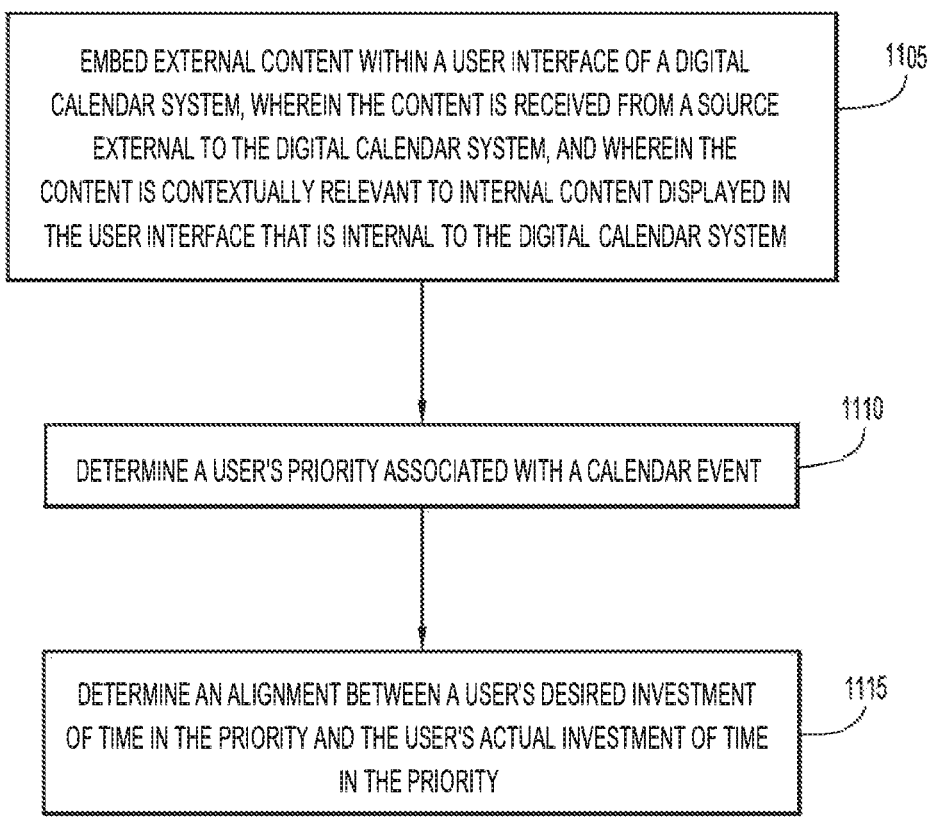
FIG. 11 is a seventh flowchart illustrating a process for transforming a digital calendar system into a strategic tool or strategy execution tool, according to an example embodiment.

With reference now made to FIG. 11, depicted therein is an alternative example embodiment of a method of generating a strategic display according to the techniques described herein. In operation 1105, external content is embedded in a user interface of a digital calendar system. The external content is contextually relevant to internal content displayed in the user interface. In other words, operation 1105 may be embodied in the generation of one or more of the displays of FIGS. 2-4. The external content of operation 1105 may be received from a data repository, such as priority data repository 518 of FIG. 5, while the internal content may comprises calendar entries or events received from a data repository internal to the digital calendar system, such as calendar data repository 512 of FIG. 5.

In operation 1110, a user's priority associated with a calendar event is determined. In other words, operation 1110 may be embodied through one or more of the operations carried out through flowchart 600 of FIG. 6. For example, operation 1110 may include determining that a user has linked a priority to a calendar entry, newly linked a priority to a calendar entry and/or newly removed a link between the priority and the calendar entry.

In operation 1115, an alignment between a user's desired investment of time in the priority and the user's actual investment of time in the priority is determined. In other words, operation 1115 may be embodied as one or more processes illustrated in flowchart 700 of FIG. 7.

Figure 12:
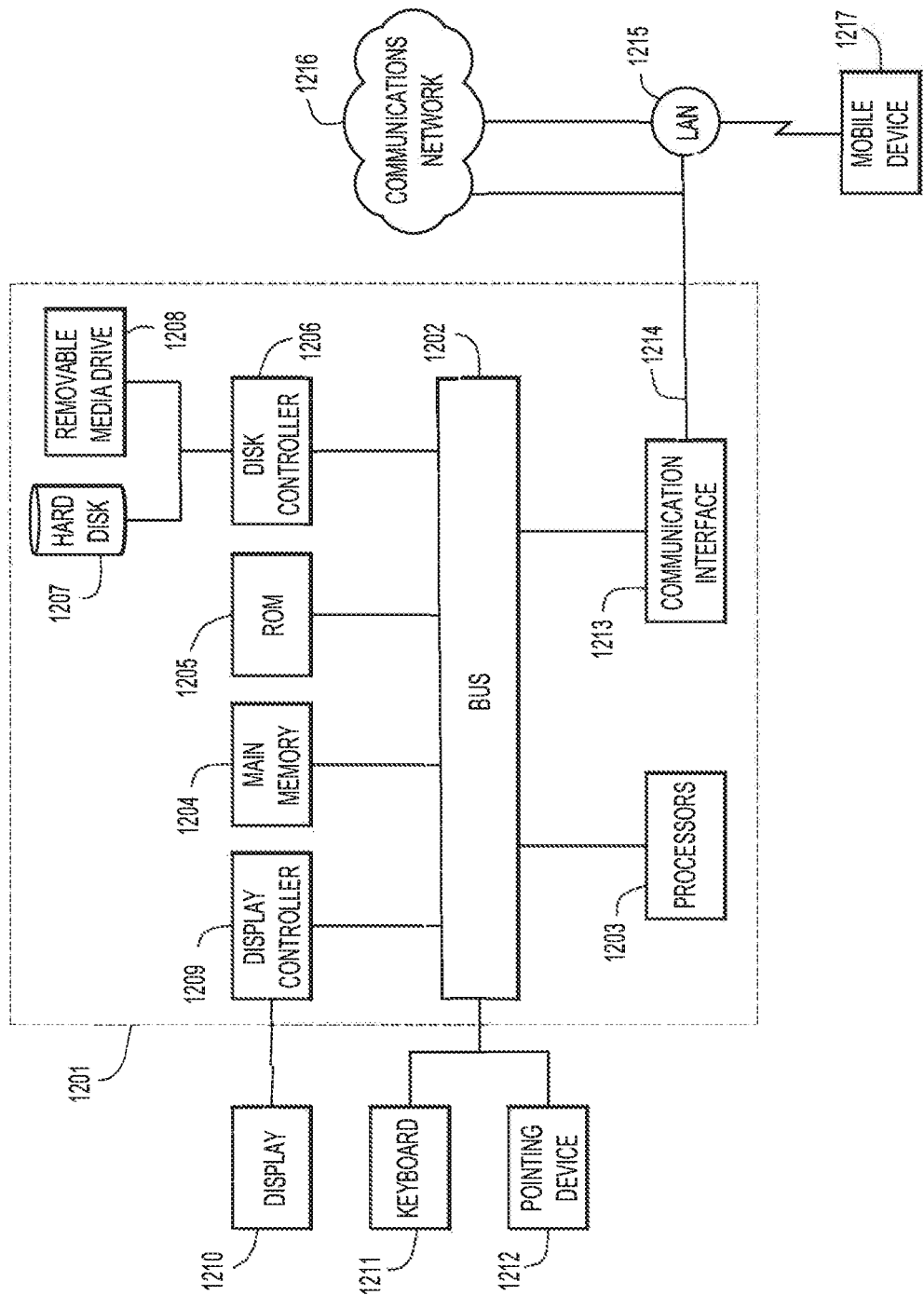
FIG. 12 is a block diagram of an apparatus configured for transforming a digital calendar system into a strategic tool or strategy execution tool, according to an example embodiment.

With reference now made to FIG. 12, illustrated therein is a computer system 1201 upon which the embodiments presented may be implemented. The computer system 1201 may be programmed to implement a computer based device, such as a video conferencing endpoint or any device includes a video encoder or decoder for processing real time video images. The computer system 1201 includes a bus 1202 or other communication mechanism for communicating information, and a processor 1203 coupled with the bus 1202 for processing the information. While the figure shows a single block 1203 for a processor, it should be understood that the processors 1203 represent a plurality of processing cores, each of which can perform separate processing. The computer system 1201 also includes a main memory 1204, such as a random access memory (RAM) or other dynamic storage device (e.g., dynamic RAM (DRAM), static RAM (SRAM), and synchronous DRAM (SD RAM)), coupled to the bus 1202 for storing information and instructions to be executed by processor 1203. In addition, the main memory 1204 may be used for storing temporary variables or other intermediate information during the execution of instructions by the processor 1203.

The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 1201 may also include a display controller 1209 coupled to the bus 1202 to control a display 1210, such as a cathode ray tube (CRT), Liquid Crystal Display (LCD) or other now known or hereinafter developed display technologies, for displaying information to a computer user. The computer system 1201 includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the process in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 1201, for driving a device or devices for implementing the process, and for enabling the computer system 1201 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a wired or wireless network interface card to attach to any packet switched (wired or wireless) LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local are network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

With reference now made to FIG. 13, depicted therein is a flowchart 1300 that provides a strategy execution tool according to the techniques of the present application. Process 1300 begins in operation 1305 where a strategic plan for a group of users is determined via a processor. The group of users may comprise a team within an organization, a department within an organization, or the entire organization itself In operation 1310, individual and group priorities related to the strategic plan are determined. For example, the priorities may include concepts such as a focus area, a specific goal, an objective, a strategy, a KPI, a task, or any desirable state or outcome desired by a user or their organization.

In operation 1315, the individual and group priorities are displayed in a digital calendar system to drive effective execution. For example, the individual and group priorities may be displayed in a user's personal information manager computing system, such as Microsoft's Outlook program.

By displaying the group priorities in such a personal information manager, the priories will be integrated into the user's existing workflow.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of transforming a digital calendar system into a strategy execution tool, the method comprising:
   determining, via a processor, a priority for a user of the digital calendar system;
      determining, via the processor, a plurality of links between the priority and a plurality of calendar entries in the digital calendar system, each link from the plurality of links being one of automatically generated or entered in response to the user dragging a representation of the priority from a first section of a user interface to a second section of the user interface, and each link from the plurality of links being illustrated by similar shadings;
   determining a change to the digital calendar system associated with the priority;
   determining an effect on the priority based on the change to the digital calendar system;
   generating data describing a display of the effect on the priority, for display via the user interface of the digital calendar system, the generating the data describing the display of the effect on the priority based on a multi-dimensional data profile of the user;
      displaying the display of the effect on the priority in the first section of the user interface; and
   displaying a plurality of calendar entries in the second section of the user interface, the second section of the user interface different from the first section of the user interface,
   the priority for the user comprising a principal area of focus that determines specific actions, choices and preferences that a user makes or has to make to achieve a certain desired outcome.

2. The method of claim 1, further comprising generating the multidimensional data profile of the user, the multidimensional data profile including a vector representation of the preferences of the user.

3. The method of claim 1, wherein generating the data describing the display of the effect on the priority comprises generating the display of the effect on the priority such that the display of the effect on the priority is embedded within the user interface of the digital calendar system.

4. The method of claim 1, further comprising initiating an action at an external device in response to determining the effect on the priority.

5. The method of claim 4, wherein initiating the action comprises at least one of: causing an external communication device to send an email, causing the external communication device to send a short message service (SMS) message, or causing the external communication device to send a chat message.

6. The method of claim 1, wherein determining the effect on the priority further comprises determining the effect on a strategy of a group associated with the user.

7. The method of claim 1, wherein generating the data describing the display of the effect on the priority comprises generating data indicative of one of: a button configured to request an agenda for a meeting the user will attend, a button configured to create an agenda for a meeting the user is organizing, or a button configured to align on priorities with another person or group.

8. The method of claim 1, further comprising scheduling a calendar entry in the digital calendar system in response to determining the effect on the priority.

9. The method of claim 1, wherein generating the data describing the display of the effect on the priority comprises generating data to color code calendar entries in the digital calendar system to correspond to the priority for the user.

10. A method of transforming a digital calendar system into a strategy execution tool, the method comprising:
    embedding, via a processor, external content within a user interface of the digital calendar system, wherein the external content is received from a source external to the digital calendar system, and wherein the external content is contextually relevant to internal content displayed in the user interface that is internal to the digital calendar system;
    determining, via the processor, and displaying in a first section of the user interface, a priority of a user, the priority associated with a plurality of calendar events, each link from a plurality of links between the priority and the plurality of calendar events being one of automatically generated or entered in response to the user dragging a representation of the priority from the first section of the user interface to a second section of the user interface, and each link between the priority and the plurality of calendar events being illustrated by similar shadings;
    determining, via the processor, and displaying in the user interface, an alignment between a desired investment of time in the priority of the user and an actual investment of time in the priority of the user;
    displaying, via the user interface, priorities of other users; and
    displaying a plurality of calendar entries in the second section of the user interface, the second section of the user interface different from the first section of the user interface,
    the user interface having a form that is selected based on a multidimensional data profile of the user, and
    priority of the user comprising a principal area of focus that determines specific actions, choices and preferences that a user makes or has to make to achieve a certain desired outcome.

11. The method of claim 10, wherein displaying the priorities of other users comprises displaying priorities for a group of users.

12. The method of claim 11, wherein embedding the external content within the user interface comprises transforming the user interface into the strategy execution tool, wherein transforming the user interface into the strategy execution tool comprises adapting the user interface from a framework configured to display transactional calendar information into a framework configured to indicate an effect of calendar events on the priority of the user.

13. The method of claim 12, wherein the framework configured to indicate the effect of calendar events on the priority of the user is configured to indicate an effect of the calendar events on priorities of the group of users.

14. The method of claim 13, wherein the external content comprises strategy related content, wherein the strategy related content is selected and embedded in response to accessing the multidimensional data profile of the user and a multidimensional data profile of the group of users.

15. The method of claim 11, further comprising displaying a specific calendar event concurrently with a priority assigned to the specific calendar event by the user.

16. A method of transforming a digital calendar system into a strategy execution tool, the method comprising:
    determining, via a processor, a strategic plan for a group of users;
    determining via the processor, individual priorities and group priorities related to the strategic plan, the individual priorities and the group priorities being linked, via a plurality of links, to a plurality of calendar entries, each link from the plurality of links being one of automatically generated or entered in response to the user dragging a representation of at least one individual priority from the individual priorities or at least one group priority from the group priorities from a first section of a user interface to a second section of the user interface, and each link from the plurality of links being illustrated by similar shadings;
    selecting a format for the user interface of the digital calendar system, the selecting based on a multidimensional data profile of at least one user from the group of users;
    displaying the individual priorities and the group priorities in the first section of the user interface of the digital calendar system, to drive effective execution; and
    displaying a plurality of calendar entries in the second section of the user interface, the second section of the user interface different from the first section of the user interface,
    each of the individual priorities and the group priorities comprising a principal area of focus that determines specific actions, choices and preferences that a user makes or has to make to achieve a certain desired outcome.

17. The method of claim 16, wherein displaying the individual priorities and the group priorities in the digital calendar system comprises displaying the individual priorities and the group priorities in a personal information manager computing system.

18. The method of claim 16, further comprising initiating an action at an external device in response to determining the individual priorities and the group priorities related to the strategic plan.

19. The method of claim 16, wherein displaying the individual priorities and the group priorities comprises displaying a specific calendar event concurrently with a priority assigned to the specific calendar event.

* * * * *